(12) United States Patent
Blake et al.

(10) Patent No.: US 11,994,851 B2
(45) Date of Patent: May 28, 2024

(54) SYSTEMS AND METHODS FOR DATA-DRIVEN PROCESS IMPROVEMENT

(71) Applicant: Finning International Inc., Vancouver (CA)

(72) Inventors: Anthony Vincent Blake, Vancouver (CA); Benjamin Rolando Ospino Costa, Vancouver (CA); Claudio Antonio Valenzuela Rodriguez, Santiago (CL)

(73) Assignee: Finning International Inc., Vancouver (CA)

( * ) Notice: Subject to any disclaimer, the term of this patent is extended or adjusted under 35 U.S.C. 154(b) by 462 days.

(21) Appl. No.: 17/294,341

(22) PCT Filed: Nov. 22, 2019

(86) PCT No.: PCT/CA2019/000159
§ 371 (c)(1),
(2) Date: May 14, 2021

(87) PCT Pub. No.: WO2020/102877
PCT Pub. Date: May 28, 2020

(65) Prior Publication Data
US 2022/0011761 A1    Jan. 13, 2022

Related U.S. Application Data

(60) Provisional application No. 62/770,997, filed on Nov. 23, 2018.

(51) Int. Cl.
*G05B 23/02* (2006.01)
*G06Q 10/0639* (2023.01)

(52) U.S. Cl.
CPC .... *G05B 23/0213* (2013.01); *G06Q 10/06393* (2013.01); *G06Q 10/06395* (2013.01)

(58) Field of Classification Search
CPC ......... G05B 23/0213; G06Q 10/06393; G06Q 10/06395
(Continued)

(56) References Cited

U.S. PATENT DOCUMENTS 11,244,025 B2 * 2/2022 Avihail ................. G06F 16/972
2010/0313001 A1 * 12/2010 Ishikawa ........... G06F 15/17375
712/225

(Continued)

OTHER PUBLICATIONS

Extended European Search Report dated Jun. 29, 2022, issued in corresponding European Application No. 19887299.6.
(Continued)

*Primary Examiner* — Ricky Go
(74) *Attorney, Agent, or Firm* — McCarthy Tétrault LLP (57) ABSTRACT

Apparatus for implementing a data processing pipeline for machine condition monitoring and other applications is provided. The apparatus comprises data processing modules communicatively coupled in series, including plug-in modules configured to receive input data, and produce output data, at least some of which is used by at least one downstream improvement system to carry out remedial actions. The apparatus also comprises a data access layer configured to receive data and make it available in a unified data format to downstream data processing modules and the at least one downstream improvement system. The data access layer comprises an enterprise service bus, and a data unification processor to convert the input data to unified data objects and make these accessible to the plug-in modules and the at least one downstream improvement system via the bus.

22 Claims, 4 Drawing Sheets (58) Field of Classification Search
USPC .......................................................... 702/183
See application file for complete search history.

(56) References Cited

U.S. PATENT DOCUMENTS

| | | |
|---|---|---|
| 2016/0241429 A1 | 8/2016 | Froehlich |
| 2017/0220403 A1 | 8/2017 | Maag et al. |
| 2020/0219024 A1* | 7/2020 | Torson ................ G06Q 10/0637 |
| 2021/0157858 A1* | 5/2021 | Stevens ................. G06F 40/279 |

OTHER PUBLICATIONS

Liu et al., "Study of Diagnosis System Framework Using Remote Knowledge Service", 2010 Prognostics & System Health Management Conference, IEEE.

* cited by examiner

SYSTEMS AND METHODS FOR DATA-DRIVEN PROCESS IMPROVEMENT

RELATED APPLICATIONS

This application claims priority from U.S. Provisional Patent Application No. 62/770,997 filed Nov. 23, 2018 entitled "Systems and Methods for Data-Driven Process Management". For the purposes of the United States, this application claims the benefit under 35 USC § 119 of U.S. Provisional Patent Application No. 62/770,997 filed Nov. 23, 2018 entitled "Systems and Methods for Data-Driven Process Management", which is incorporated herein by reference in its entirety.

TECHNICAL FIELD

This present disclosure relates generally to systems and methods for machine condition monitoring using data-driven processes.

BACKGROUND

Figure 1:
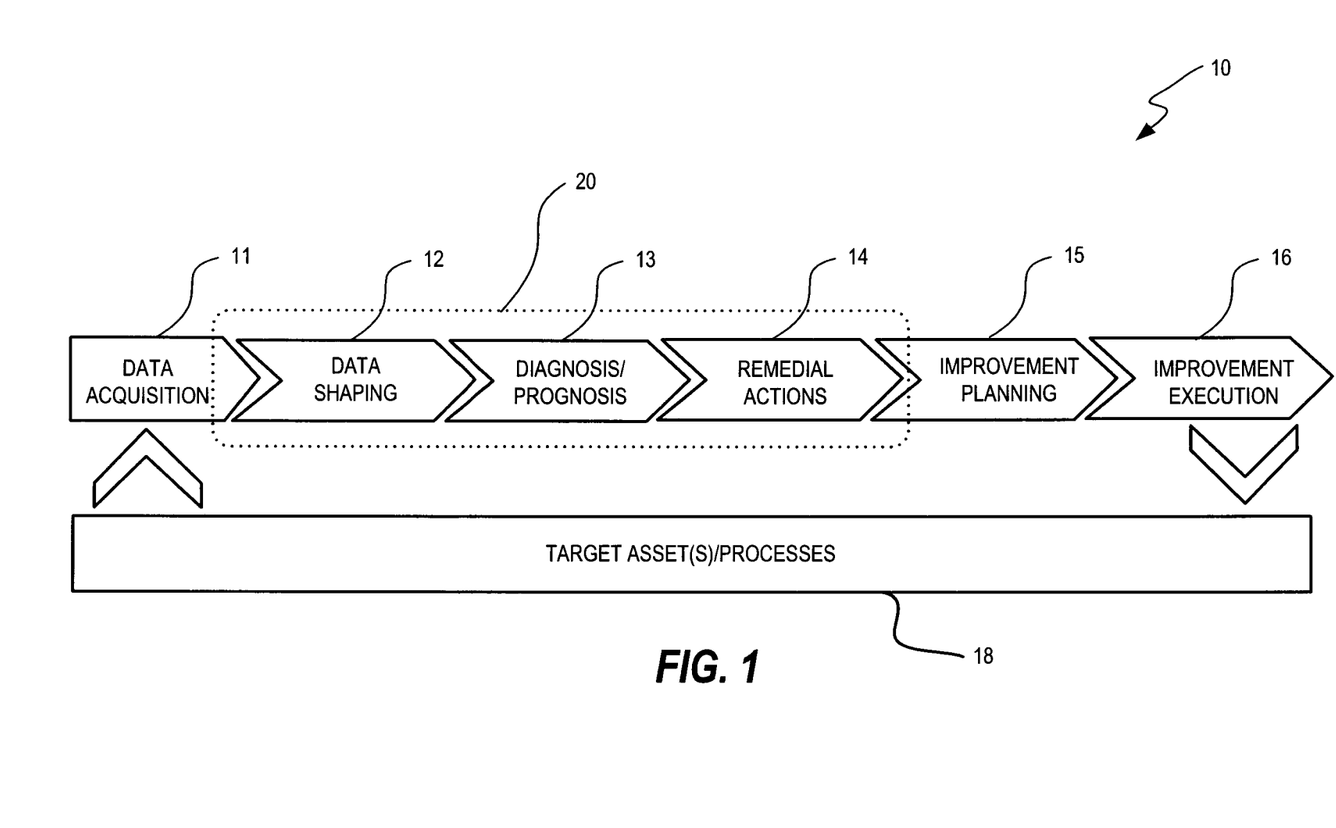
FIG. 1 illustrates the elements of a pipeline for a data-driven process.

Large construction and civil engineering projects are increasingly using data-driven processes to assist with the design, planning and management of such projects. Such data-driven processes can be implemented by a pipeline comprising a series of data processing elements. FIG. 1 shows the data processing elements for a representative pipeline 10. Output from the previous step becomes input for the current step in the pipeline. In the illustrated example, the pipeline's data processing elements comprise: (1) a data acquisition module 11 to obtain raw data from physical or commercial assets, such as vehicles, machines, equipment, and the like and processes (collectively, target assets/processes 18) (providing visibility into what is happening); (2) a data shaping and interpretation module 12 to process the raw data to obtain information relevant to machine conditioning monitoring or other processes, such as condition or key performance indicators (providing visibility into what may be wrong or what could go wrong); (3) a diagnosis/prognosis module 13 to look at what happened (providing insight into causes) and forecast what may happen, and analyze impediments to optimal performance; (4) recommendations module 14 to recommend remedial actions to resolve the existing or pending issues; (5) an improvement planning module 15 to determine a plan for the remedial actions (e.g. scheduling or timing of fixes); and (6) an improvement execution module 16 to execute remedial actions to resolve the existing or pending issues. The data shaping and interpretation module 12, diagnosis/prognosis module 13 and recommendations module 14 may collectively be referred to as the diagnostic portion 20 of the pipeline 10.

The improvement planning module 15 and improvement execution module 16 are generally highly dependent on the domain being targeted. For example, correcting a mining truck's fuel consumption issues is a different problem from optimizing a supply chain. As such, there exist a myriad of solutions and domain-specific needs, and many types of techniques and tools are used to implement the objectives of data shaping and interpretation module 12, diagnosis/prognosis module 13 and recommendations module 14. For example, depending on the domain, data shaping techniques employed by data shaping and interpretation module 12 can incorporate one or more of: baseline threshold application, statistical analysis, rule-based analysis, neural-networks, genetic algorithms, machine-learning, and the like. Given this variety of tools, data pipelines for construction or civil engineering project management are generally custom-built from scratch or built on top of a highly constrained out-of-the-box framework.

"Bespoke" or dedicated pipelines are generally limited and inflexible in terms of the techniques that can be applied to each processing step. In addition, it takes considerable effort to develop and realize a fully functional, dedicated pipeline for a particular application.

As such, there is a need for systems and methods for the development of pipelines for data-driven processes which address or ameliorate one or more of the aforementioned disadvantages.

SUMMARY OF THE DISCLOSURE

The present specification relates to a framework that allows for the development of pipelines for data-driven processes for processing and diagnosing data, diagnosing performance impediments and recommending or executing remedial actions.

One aspect of the invention provides apparatus for implementing a data processing pipeline. Such data processing pipeline may be used for machine condition monitoring and maintenance. Particular embodiments may have applications for management of a construction project and/or civil engineering project. The apparatus comprises a plurality of data processing modules communicatively coupled in series, including a plurality of plug-in processing modules configured to receive input data objects and, based at least in part on the input data objects, produce output data objects, wherein at least some of the output data objects are used by at least one downstream improvement system to carry out remedial actions. The apparatus also comprises a data access layer configured to receive output data from the plurality of plug-in data processing modules and input data from at least one data source, and make the input data and the output data available in a unified data format to downstream data processing modules and the at least one downstream improvement system.

In some embodiments, the data access layer comprises an enterprise service bus communicatively coupled to each of the plurality of plug-in processing modules and each of the at least one downstream improvement system. The plurality of plug-in processing modules provides a diagnostic portion of the data processing pipeline. The enterprise service bus is configured to integrate the diagnostic portion of the data processing pipeline with the at least one downstream improvement system.

In some embodiments, the data access layer may comprise a data unification processor configured to convert the input data to a plurality of unified data objects and make the unified data objects accessible to the plurality of plug-in processing modules and the at least one downstream improvement system via the enterprise service bus. The data access layer may comprise one or more filtering components configured to selectively make at least a portion of the input data available for conversion to unified data objects by the data unification processor. The data access layer may comprise an output moderator configured to aggregate output data from the plurality of plug-in processing modules and implement a conflict resolution process if a conflict is detected in the aggregate output data.

In particular embodiments, the data access layer is configured to receive baseline reference data comprising baseline intelligence and/or configuration data. The baseline reference data is made available to the plurality of plug-in processing modules via the enterprise service bus. The output moderator may be configured to adjust the baseline reference data to reduce the likelihood of conflict in output data from the plurality of plug-in processing modules.

In some embodiments, the plurality of plug-in processing modules comprises a data shaping module configured to process raw data and generate condition and key performance indicators based on the raw data, wherein each of the condition and key performance indicators comprises one or more of: a metric of a condition of an asset or process, attributes such as source data, processing descriptions and statistics, and audit information that can be used by the next step to assist in its subsequent use and interrogation.

The plurality of plug-in processing modules may also comprise a diagnosis/prognosis module configured to receive condition and key performance indicators generated by the data shaping module, and based at least in part on the condition and key performance indicators, generate fault objects, each of the fault objects comprising one or more of: a description or identification of the likely fault, confidence factor, weighted associated root cause, residual life estimate, meta-data about the method and explanation of how the conclusion was reached and a trace back to the underlying condition indications.

The plurality of plug-in processing modules may also comprise a remedial action recommendation module configured to receive fault objects generated by the diagnosis/prognosis module, and based at least in part on the fault objects, generate remedial action objects, each of the remedial action objects comprising one or more of: a description or identification of the action that should to be taken to solve or prevent an issue, a priority and time-window within which the action should take place, an explanation tracing from data to condition insights to fault and root case, and domain specific properties for use by the at least one downstream improvement system.

Another aspect of the invention provides a method for implementing a data processing pipeline for management of a construction project and/or civil engineering project. The method comprises providing a plurality of plug-in processing modules configured to receive input data objects and, based at least in part on the input data objects, produce output data objects, wherein at least some of the output data objects are used by at least one downstream improvement system to carry out remedial actions; receiving data from at least one data source and the plurality of plug-in data processing modules; processing the data into data objects having a unified data format; and making the data objects in the unified data format available to downstream data processing modules and the at least one downstream improvement system.

The method further comprises communicatively coupling an enterprise service bus to each of the plurality of plug-in processing modules and each of the at least one downstream improvement system, and integrating the plurality of plug-in processing modules and the at least one downstream improvement system via the enterprise service bus.

In particular embodiments, the input data is converted to a plurality of unified data objects which are made accessible to the plurality of plug-in processing modules and the at least one downstream improvement system via the enterprise service bus. The input data may be filtered prior to converting the input data to unified data objects.

The output data from the plurality of plug-in processing modules may be aggregated, and a conflict resolution process is performed if a conflict is detected in the aggregate output data. In some embodiments, baseline reference data may be received, comprising baseline intelligence and/or configuration data, wherein the baseline reference data is made available to the plurality of plug-in processing modules via the enterprise service bus. The baseline reference data may be adjusted to reduce the likelihood of conflict in the output data produced by multiple plug-in processing modules.

Additional aspects of the invention will be apparent in view of the description which follows.

BRIEF DESCRIPTION OF THE DRAWINGS

Features and advantages of the embodiments of the present invention will become apparent from the following detailed description, taken in with reference to the appended drawings in which.

DETAILED DESCRIPTION

The description which follows, and the embodiments described therein, are provided by way of illustration of examples of particular embodiments of the principles of the present invention. These examples are provided for the purposes of explanation, and not limitation, of those principles and of the invention.

A data processing pipeline that ingests raw data ("raw" relative to the context, as described herein) and identifies remedial action (i.e. data, insights, action) may incorporate many tools and techniques. To create such a pipeline, generally either a custom pipeline is built from low level building blocks or is developed within a pipeline with built-in capabilities wherein the pipeline is constrained to those capabilities.

In the domain of maintenance support systems, maintenance technologies in use include: Failure-Based or Breakdown Maintenance (FBM); Scheduled or Preventive Maintenance (PM); Predictive Maintenance (PdM); and Proactive Maintenance (PaM). The data processing pipelines which implement these systems are bespoke solutions, and require extensive custom builds.

There is much support machinery that is needed to implement a diagnostic processing pipeline. The diagnostic pipeline framework described herein provides the necessary machinery to support a variety of different applications so that the developer, analyst, or domain subject matter experts can concentrate on the innovative portion of the job rather than the mundane part of building all the machinery each time a new custom pipe is built.

Accordingly, an aspect of the invention relates to a framework built to support the implementation of a data processing pipeline. The framework is configured to enable one or more processing modules to be plugged in to customize the pipeline for different applications. A custom development utilizing this framework can have the pipeline developed more efficiently and at lower costs. Described herein is the machinery around the plug-in modules that feed in the raw data and handle the subsequent condition indication, fault and remedial action objects. The machinery may also manage to at least some extent the supply and maintainability of certain baseline reference information as well as the progression through a portion of the data processing pipeline.

Processing modules that may be plugged into the framework may range from supporting data visualization (e.g. allowing an operator to select from a set of output data objects and their properties for viewing) to fully automated routines utilizing a wide myriad of techniques and tools. Each of the plug-in modules obtains inputs (which may include input data and reference data) and executes functions to produce output data which may be used by one or more of the downstream modules. As explained in more detail herein, aspects of the framework which enable processing modules to be plugged in include: standardization of access to input data; reference data and notification queues, and standardized access to same; and production of output data in a standard format.

Figure 2:
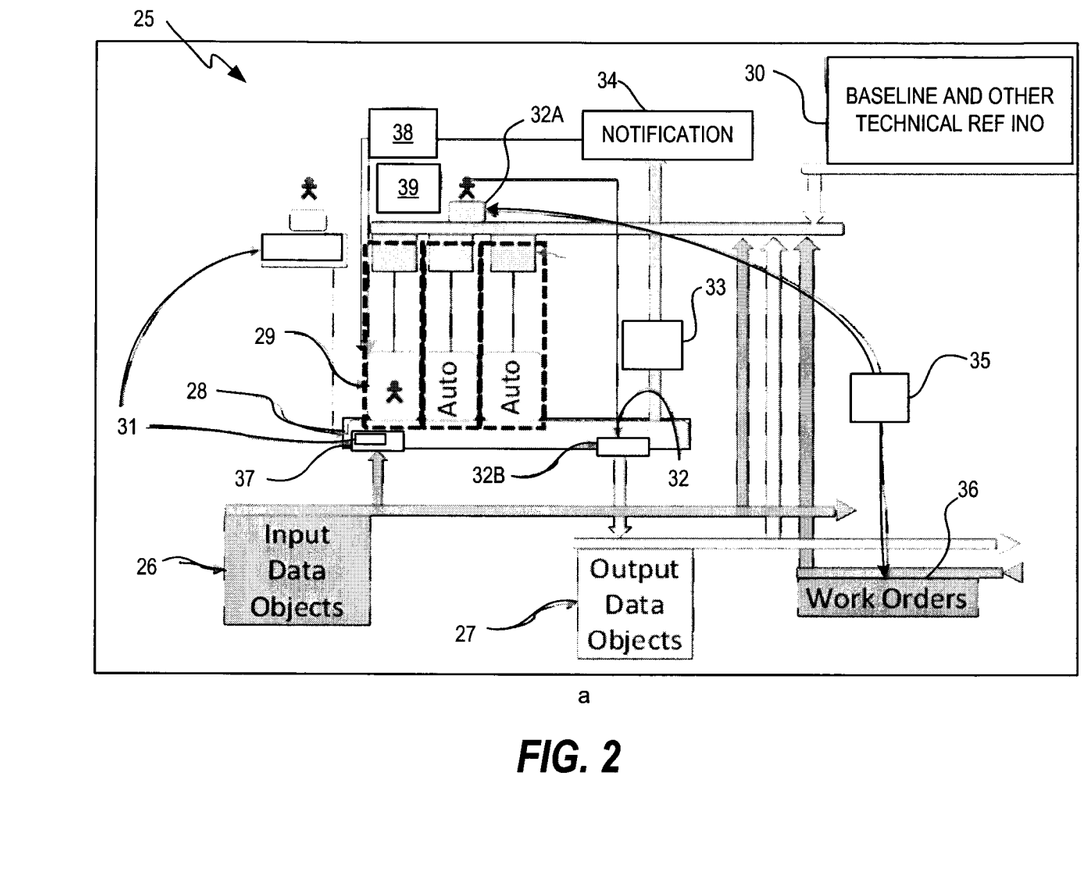
FIG. 2 illustrates the framework machinery for a single step in a data pipeline according to one embodiment.

FIG. 2 shows machinery 25 according to one embodiment for the implementation of a data processing pipeline. FIG. 2 illustrates the machinery 25 for a single step in the pipeline. Not all of the steps in the pipeline need to utilize all of the features of the machinery 25 described herein. The machinery 25 supports the plug-in of one or more processing modules 29. For each plug-in processing module 29, the machinery 25 receives a set of input data objects 26, which is processed by the module 29 to generate a set of output objects 27. For example, in the domain of machine condition monitoring, for a plug-in processing module 29 configured for data shaping, the input data objects 26 to this module comprise the data from physical or commercial assets, such as vehicles, machines, equipment, and the like, as received and processed by the data acquisition step 11 of the data pipeline. In other embodiments, where the pipeline is applied to a business process or a physical process such as ore reduction, then data may be received from "processes" (e.g. maintenance process). The output objects 27 of the data shaping module may subsequently be provided as input to a downstream plug-in processing module 29 configured for diagnosis/prognosis.

Standard or unified data objects are supported by the framework according to particular embodiments. For example, according to particular embodiments, the output of data shaping module is condition indication or key performance indication (KIP) data. The output of the diagnostic/prognostic module is fault/issue data objects. The output of the remedial recommendation module is the remedial action data objects. As long as each plug-in processing module 29 can ingest input data and produce these standard data objects (i.e. one or more of condition indication/key performance indication data, fault/issue data objects and remedial action data objects), it is able to operate within the pipeline framework.

The machinery 25 comprises a data access layer (DAL) 28 (also referred to as a data service layer) that makes the input data available to the plug-in processing modules 29 in a common way. As described below, not all "input" data is necessarily surfaced into the DAL 28. For example, some data may be filtered out and therefore prevented from being communicated over the DAL 28. In some embodiments, as described below, the DAL 28 comprises an enterprise service bus (ESB) (or a similar network and messaging backbone) that links multiple systems and applications via a bus-like infrastructure. The ESB of machinery 25 is capable of receiving data from the data acquisition system and modules and re-routing or redirecting the data Baseline reference data 30 may be used by one or more of the plug-in processing modules 29. Baseline reference data 30 provides the baseline intelligence or configuration data used by the processing module 29. The makeup of this data is dependent on the technique and technology used within the processing module 29. However, its management is standardized and managed by the framework. For example, for the data shaping step, the baseline reference data may be threshold data. An engine oil temperature of 140° C. is raw data, while baseline reference data is a threshold indicating that engine oil temperature above 120° C. indicates a critical condition. The combination of these two data items allows an engine oil temperature condition indication of critical to be interpreted and passed onto the next step (e.g. diagnosis/prognosis).

The machinery 25 for the data acquisition system may gather data from many sources and for many processes and assets, not all of which may be used in the subsequent steps of the processing pipeline. A source filtering and mapping component 31 limits the data available from the data acquisition system (i.e. limiting the data from the unified data provided by the data acquisition system), effectively isolating the diagnostic processing pipeline from the data sources. The data acquisition system performs data mapping and transformation to make the data available to the DAL 28 in a standard manner that is then surfaced to the plug-in processing modules 29. The data source processing functionality can be provided as a sub-component 37 of the DAL 28, as seen in FIG. 2. The implementation of this functionality can be enhanced by providing access to queryable data source schema and meta-data, which is a desirable characteristic for the data acquisition layer.

The machinery 25 also comprises an output moderator 32 for aggregating information from multiple plug-in processing modules 29. Output moderator 32 may incorporate conflict resolution mechanisms if conflicting output data is generated by the plug-in processing modules 29. Output moderator 32 may contribute to fine tuning the baseline reference data 30 to reduce the likelihood of conflict with other plug-in processing modules 29. Output moderator 32 may also aggregate output data objects 27 into hierarchies to produce higher level outputs. For example, output moderator 32 may facilitate roll-up of condition indicators across multiple asset components. The aggregation and roll-up functionality may be performed within the data shaping step. It can be used to drive a visualization dashboard, as a bolt-on to the processing pipeline.

The DAL 28 exposes an event/notification generator 33 for a plug-in processing module 29 to generate an event or a notification 34. An event could be used as a means to trigger a follow-up action in any other system listening for that event. Notifications may be used to target a person or asset who would be expected to take action based on the notification. Notifications may be transmitted where there are parties or assets in the loop that need to be notified of a condition, a fault or an action that needs to be serviced. Notifications generated by the pipeline may be fed into a built-in or an external task management system 38. Such notifications provide notice of an existing or impending situation. The notification mechanism is used by the processing machinery to raise such a notification into the external system (e.g. external notification engine(s)) that would then handle those notifications further (e.g. by sending a person assigned to handle those specific types of notifications an SMS message or an e-mail). The plug-in processing module 29 determines whether a notification is needed.

The framework provided by the FIG. 2 machinery 25 supports the use case where remedial actions are governed by work orders 36 within an external enterprise system outside of this framework. If the external system is able to facilitate the trace-through of the condition, fault and/or remedial action "bread-crumbs" that are inserted into the work order feedback 35 into the pipeline, then it may facilitate the use of feedback to assist in the assessment of the accuracy and precision of the condition indications, fault diagnosis/prognosis and remedial actions. In addition, post-correction statistical analysis may be carried out to provide data that may be used to fine tune things such as weighting factors in the reference data.

The framework provided by the FIG. 2 machinery 25 includes the means to maintain the baseline reference data 30 used to drive a processing module 29. Depending on the processing module 29, this baseline reference data 30 may comprise generic data sets that apply across all instances of an asset or process type, or multiple "local condition" baseline sets that account for local variations to allow more accurate interpretation and diagnosis. As an example of local condition baselines, certain condition monitoring thresholds may differ between warm and cold climates, or between high and low altitudes, or there may be regional variations for certain processes. As the system is used more and feedback is provided to ascertain the accuracy of interpretation, diagnosis and recommendations, the baseline reference data 30 can be fine-tuned to improve the overall performance of the data processing pipeline.

As the system is used, feedback from the output moderator 32 can also be used to improve a processing module 29's baseline reference data 30. This amounts to fine tuning reference information so that the processing modules 29 collectively minimize making conflicting conclusions. For example, if an original equipment Manufacturer (OEM) sets a threshold of 125° C. for engine temperature, this temperature can be used in a threshold based processing module (e.g. diagnosis/prognosis module) to flag engine temperature issues. However, from the feedback 32B provided by the machine learning module, it may be observed that issues are consistently arising only after a temperature of 140° C. is reached. In this case, the SME (subject matter expert) may decide to raise the threshold to 135° C. to reduce the number of "false alerts" from the threshold processing module. A user interface 39 may be provided to enable the subject matter expert to maintain the reference data based at least in part on feedback 32B provided by the machine learning module.

Access to other technical reference data used by the modules (e.g. make, model related data) may be provided. For example, baseline reference data 30 may be tagged with additional dimensions for classification and categorization. Access to this data may be through means similar to those for accessing data within the data acquisition system.

Figure 3:
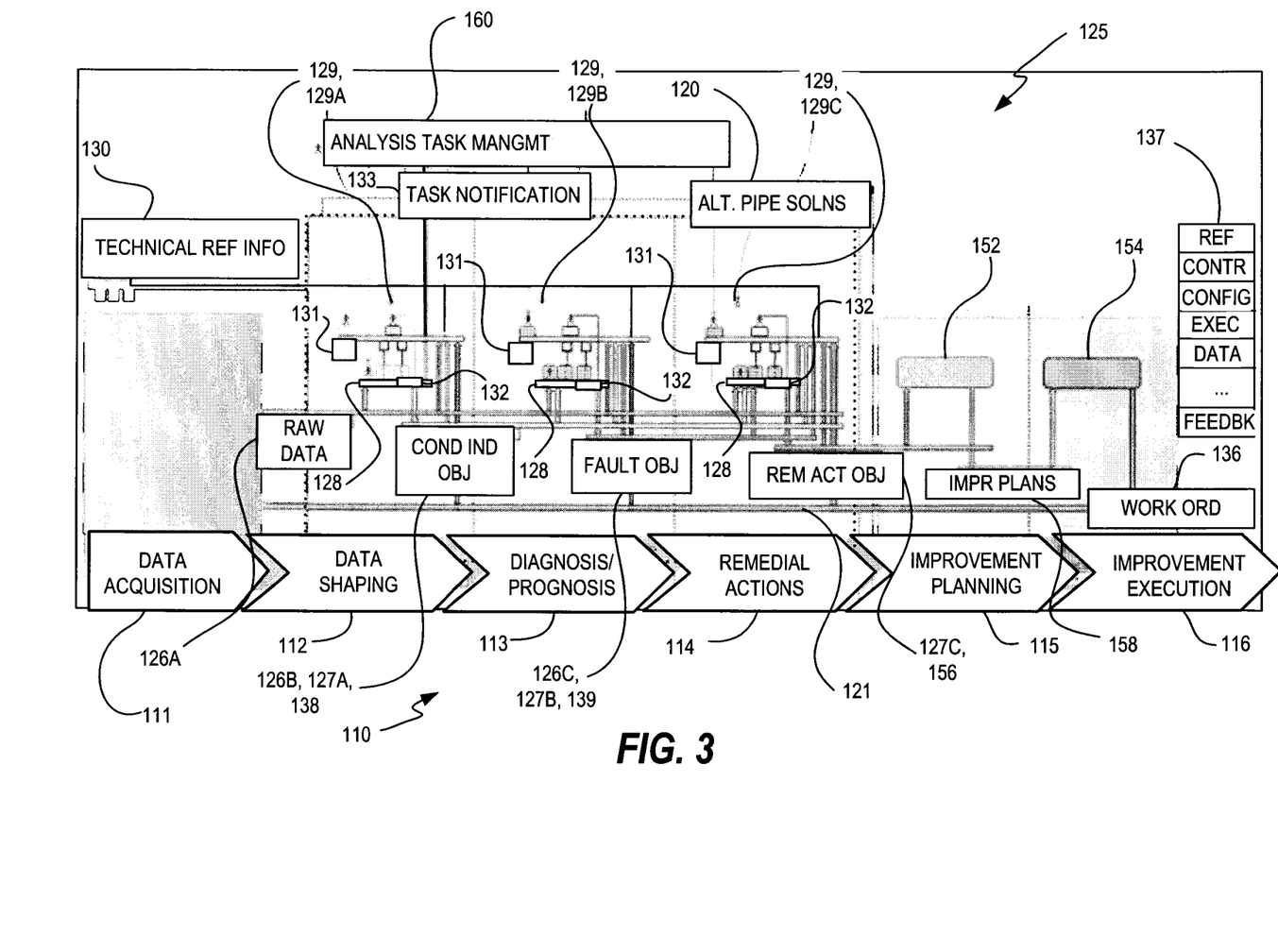
FIG. 3 illustrates the framework machinery for a diagnostic pipeline according to one embodiment.

FIG. 3 shows the machinery 125 for a diagnostic pipeline 120 assembled with plug-in processing modules 129 for data shaping (module 129A), diagnosis/prognosis (module 129B) and remedial action recommendations (module 129C). In general, similar reference numerals are used to refer to any components similar to those seen in FIG. 2, except in FIG. 3 the reference numerals are also prepended with a "1".

In the FIG. 3 embodiment, pipeline 120 comprises three plug-in processing modules 129: data shaping module 129A, diagnosis/prognosis module 129B and remedial action recommendations module 129C. Each module 129 accepts input data 126 and produces output data 127. The output data 127 for a module 129 may then be used as the input data 126 for one or more downstream modules 129. In general, each module 129 is denoted by a reference numeral which ends with a letter specific to that module (e.g. "A", "B", "C", etc.). Reference numerals denoting inputs to or outputs from a particular module 129 are appended with the letter specific to that module (e.g. module 129A receives input 126A and produces output 127A).

Plug-in processing module 129A is for the data shaping step of the pipeline 120. The purpose of the data shaping step is to observe raw input data 126A and generate condition indications or key performance indicators 127A based on the observations. Data shaping consolidates large volumes of contributory data to a smaller set of finely tuned condition indications. The term "raw" in relation to the input data 126A is relative to the context. When the data 126A is input to plug-in processing module 129A, there may already have been data processing, quality processing and transformation of the data to put it into a state that the data service layer makes available to downstream services. However, in the context of the processing pipeline, it can be considered "raw" input data.

A condition indication is a measure of how good something is. It can be referred to as a "goodness" metric, or conversely, a "badness" metric. In one example embodiment, a condition indication is a number from 0 to 1. If it indicates goodness, then 0 implies no goodness (i.e. maximum badness) and 1 indicates the perfect condition full of goodness. The condition indication data object 127A produced by data shaping module 129A contains a value for the condition indication (e.g. a number from 0 to 1). The condition indication data object 127A may also contain attributes such as source data, processing descriptions and statistics (e.g. fuzzy rule based processing along with a confidence measure of its accuracy) and audit information that can be used by the next step to assist in its subsequent use and interrogation.

In the case of a machine, the condition is first applied to components or features (e.g. the condition of the tires or brakes, as an indicator of whether the brakes are in a bad condition). This can be rolled up to the asset itself by applying weighting to the individual contributing parts: for example, the brakes are bad, the tires are good, the engine is good for another 10,000 km, so, overall the asset is okay (not good, but also not fully bad). This can similarly be applied to tasks or processes in construction, for example, for a given desired surface (e.g. road or rail surface), 80% of the current surface is at grade (i.e. matches the desired surface) and 40% is at the right level of compaction. If this data is then compared to acceptance thresholds, the condition of the surface can be classified as good, okay or bad for example. Take the case of the acceptance thresholds being set at 75% on grade (within 5% tolerance) and 90% at the right compaction level. With the actual grades being 80% and 40% retrospectively, then grade is good and compaction is bad, and overall, the surface is bad.

One or more various techniques may be implemented by plug-in processing module 129A to generate the condition indications. Such techniques may include, for example, pattern detection techniques. These may incorporate statistical clustering and artificial intelligence (deterministic and non-deterministic) methods that observe large pools of data (both in terms of number of variables and time ranges) and derive condition indications. Other techniques include assessment of thresholds indicating good (green), warning (amber) and critical (red) regions (good high, low and "sweet-spot").

The next plug-in processing module 129B (downstream of plug-in processing module 129A is for the diagnosis/prognosis step of the diagnostic pipeline 120. The purpose of the diagnosis step is to determine, based on the condition indicators generated by plug-in processing module 129A, the most likely underlying root causes of issues and the faults that are manifested as a result. Diagnosis looks for things that have already happened (i.e. it looks backward in time). Efforts to determine a likely root cause are made because it is usually the root cause that needs to be addressed by the remedial action. Addressing the observed symptoms may not necessarily resolve the underlying issue. Techniques used for diagnosis include, for example, FMECA (Failure Mode Effects and Criticality Analysis) and various artificial intelligence and operations research-based techniques such as rule-based expert systems, neural networks, queuing theory, simulation, and the like.

Prognosis is similar to diagnosis, but it is forward looking trying to predict if and when faults may occur. One example outcome is a remaining useful life estimate. For example, suppose it is expected that a fault is likely to occur if the current trend continues for more than 30 days. There is then an opportunity within the next 30 days to intervene and prevent the failure. The principle here is to observe trends of symptoms associated with failures and underlying root causes and predict when the failure is likely to occur as well as the subsequent repercussions if the failure is allowed to occur.

The input(s) to the plug-in processing module 129B (diagnosis/prognosis) are condition indication object(s) 127A output by plug-in processing module 129A (data shaping). The pipeline framework also provides plug-in processing module 129B with access to the same underlying raw data set 126A as is available to the plug-in processing module 129A at the data shaping step. This is to facilitate the utilization of methods that go directly from raw data to fault diagnosis/prognosis without relying on intermediate condition indication objects. These include methods such as machine learning and neural networks that are trained on large data sets rather than relying on specific deductive rule-based reasoning. Machine learning methods, however, are generally less capable of explaining their reasoning.

The output of the plug-in processing module 129B is one or more fault objects 127B. Each fault object 127B may contain a description of the likely fault, confidence factor, weighted associated root cause(s), residual life estimate (for prognosis), meta-data about the method and "explanation" of how the conclusion was reached and a trace back to the underlying condition indications. The fault object contains the situation seed data for determining the best remedial action(s).

The next plug-in processing module 129C (downstream of plug-in processing module 129A and 129B) is for remedial action recommendation. The purpose of the remedial action step is to identify the best course of action to resolve the cause of the observed (or predicted) fault. The methods that can be applied to this step are similarly as varied as with the previous steps. They could range from a mapping table between root cause and remedial action to sophisticated model and simulation-based methods taking into account a variety of supplementary situational data.

The input(s) to the plug-in processing module 129C (remedial action recommendation) are the fault object(s) 127B output by plug-in processing module 129B (diagnosis/prognosis). The pipeline framework also provides plug-in processing module 129C access to the same underlying raw data set 126A and condition indication objects 127A that are available to the plug-in processing module 129B. This allows plug-in processing module 129C to support data driven pattern recognition and machine learning methods in addition to inductive and deductive deterministic rule-based reasoning methods.

The output from the plug-in processing module 129C is one or more remedial action objects 127C. Remedial action objects 127C contain at least a description or identification of the action that needs to be taken to solve (or prevent) an issue. Additionally, they may contain the priority and time-window within which the action must take place and "explanation" information tracing from data to condition insights to fault and root case. Remedial action objects may also contain domain specific properties that may be used by one or more downstream improvement planning and execution systems, of which representative systems 152, 154 are depicted in FIG. 3. The downstream improvement systems 152, 154 receive these recommendations, plan for their execution and execute them. Unlike the plug-in processing modules 129A, 129B and 129C which are domain agnostic, the downstream systems 152, 154 are domain and situation specific systems (e.g. for enterprise applications such as enterprise resource planning (ERP) and work management systems). In particular embodiments, these downstream systems may not be considered an integral part of the diagnostic pipeline.

Figure 4:
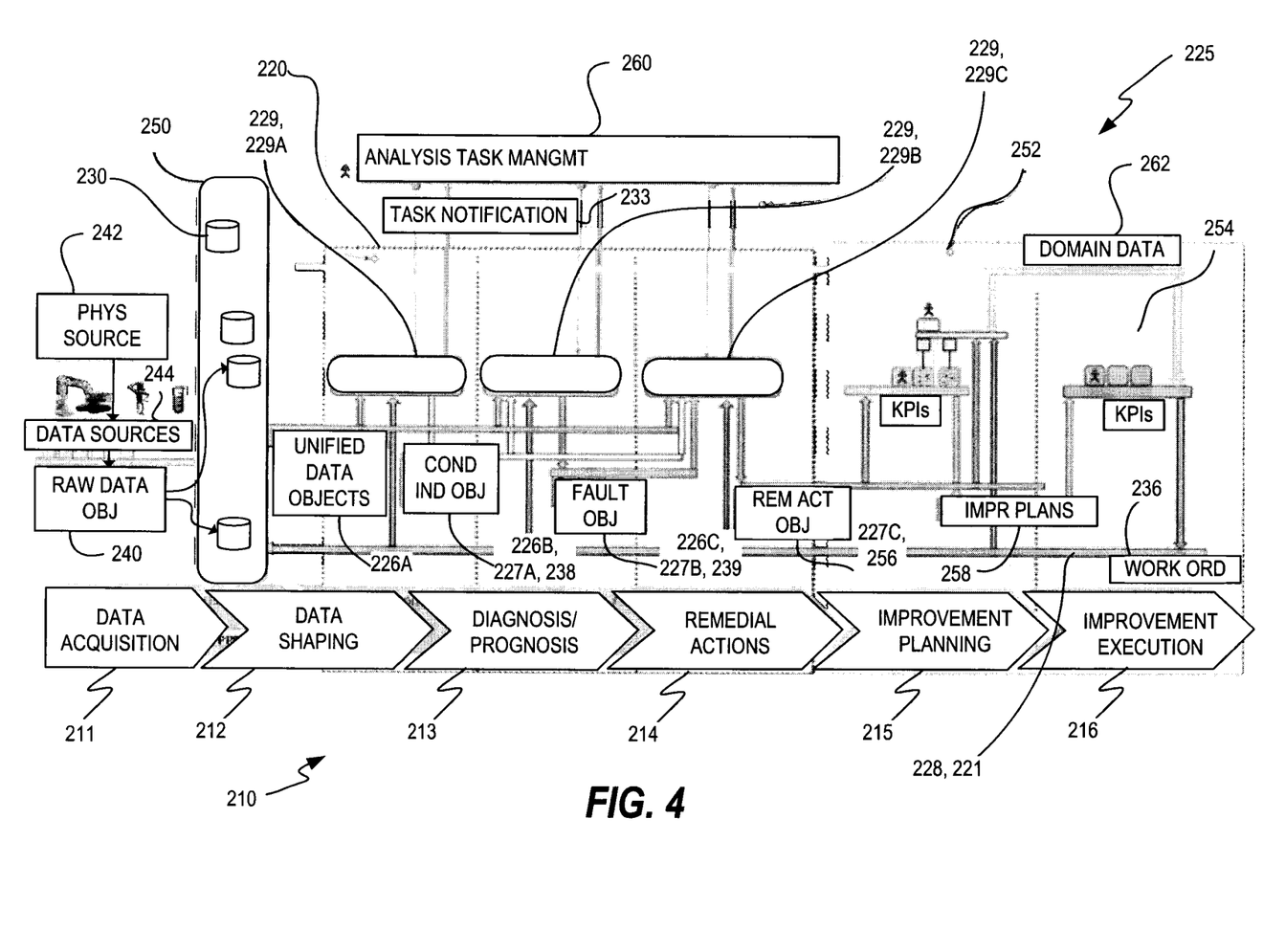
FIG. 4 illustrates a data processing pipeline built using the framework machinery according to one embodiment.

FIG. 4 depicts a data processing pipeline built using machinery 225 according to one embodiment. In general, similar reference numerals are also used to refer to any components similar to those seen in FIGS. 2 and 3, except in FIG. 4 the reference numerals are also prepended with a "2". In FIG. 4, diagnostic pipeline 220 is the portion of the data processing pipeline that comprises the data shaping, diagnosis/prognosis and remedial action recommendation steps.

Machinery 225 comprises a data acquisition module 250. This may be implemented by one or more systems that gather data from one or more sources, ingest it, transform it, perform data quality assessments and corrections and warehouse the data into one or more warehouse technologies. Particular embodiments incorporate a unified data model for the data at the consumption side to isolate downstream consumers from internal schema and data source volatility. In the context of the illustrated embodiment, the data acquisition module 250 provides the raw data to the diagnostic pipeline 220. An instance of the diagnostic pipeline 220 may integrate with the data warehouses via APIs, bulk-data pipes and/or event subscriptions on an enterprise service bus (ESB) 221 serving as the DAL 228.

The next downstream portion of the machinery 225 is the diagnostic pipeline 220. Such diagnostic pipeline 220 may be similar to the exemplary domain-agnostic diagnostic pipeline 120 of FIG. 3 as described above. In the FIG. 4 embodiment, diagnostic pipeline 220 comprises plug-in processing modules 229A (data shaping), 229B (diagnosis/prognosis) and 229C (remedial action recommendation).

Downstream of the diagnostic pipeline 220 is one or more improvement planning and execution modules, of which representative modules 252, 254 are depicted in FIG. 4. In particular embodiments, these systems are domain-specific systems for planning, managing and executing the work needed to resolve the issues observed for the assets and processes analyzed by the diagnostic pipeline. These could be, for example, asset management systems, supply chain systems, manufacturing process systems, training systems, etc. In some cases there may be room for opportunistic actions based on the recommended actions (e.g. while having the engine block open to replace a faulty value, the gaskets and seals may be replaced at the same time). An instance of the diagnostic pipeline 220 may be integrated with these systems via an event driven enterprise service bus (ESB) 221 serving as the DAL 228, where the improvement planning and execution systems may subscribe to the remedial action object queue. In alternative embodiments, instead of an ESB, a common shared data structure is used, whereby all collaborating processes have access to the same underlying data and when one process changes the data, other processes are triggered using change triggers. This method, however, creates architectural coupling which may make the system brittle to change. It may be more desirable to design a framework in which systems are decoupled so that they can evolve independently. Decoupling of the systems can be achieved through the provision of the ESB 221 or a similar network and messaging backbone that integrates different systems and applications over a bus-like infrastructure and makes input data available to these systems and applications in a common way.

In the illustrated embodiment of FIG. 4, machinery 225 incorporates an analysis task management system 260. This is an optional system for handling notifications produced by task notification generator 233 and manual tasks executed within the diagnostic pipeline 220. A ticket management system may be used to implement analysis task management system 260 in particular embodiments.

In general, one-size-fits-all solutions for data processing pipelines do not work for a large range of domains and problem types. However, the unconstrained plug-in framework described herein with reference to FIGS. 2, 3 and 4, provides a highly extensible, domain agnostic machine that can be used for many purposes or domains. These include, for example, mining and construction machinery condition monitoring for preventative and predictive maintenance, and supply chain monitoring and optimization. The plug-in framework described herein reduces development costs since the pipeline does not need to be built from scratch for each purpose. In particular embodiments, the framework may be implemented using Microsoft Azure PaaS technologies (e.g. CognosDB, EventBus, Logical Functions, etc.) and the Angular (javascript) UI framework.

The pipeline framework described herein is domain agnostic, technique agnostic and highly configurable and flexible. As such, many highly specialized diagnostic or optimization pipelines can be built using the same framework. In particular, the underlying enablers are already provided and it is mainly the processing modules that need to be developed and plugged into the framework. More efficient pipeline development is achieved by providing the underlying data objects and a standard means of accessing, producing and managing that data in a way that allows plug-in processing units utilizing an array of technologies and techniques to conduct the processing stages of data shaping, diagnostics/prognostics and remedial action recommendation, producing and customizing multiple processing pipes. The pipeline may be placed into operation once at least one plug-in module is available for each step (data shaping, diagnostics/prognostics and remedial action recommendation), and the data configuration has been completed.

One of the purposes of the framework is to facilitate the coordinated use of the techniques outlined below. Generally, without the framework disclosed herein, a small subset of the following techniques would otherwise be hard coded into a solution with a very specific purpose. The framework facilitates a more flexible and agile way of producing a range of special purpose systems.

This framework may be used to implement the coordinated use of separate systems, operable to perform one or more techniques, such as, for example:

Data processing and feature extraction: principal component analysis; wavelet analysis; spectral analysis; statistical indicators (i.e. RMSE, kurtosis and skewness)

Feature selection: filter approaches (i.e. genetic algorithm, differential evolution and correlation analysis); wrapper approaches (i.e. genetic algorithm, differential evolution and classification algorithm); random feature subset selection; sensitivity analysis techniques; box plot analysis; correlation analysis; spectral analysis Fault Detection: principal component analysis; auto-associative kernel regression; evolving clustering method; neural networks; ensemble systems; fuzzy similarity; fuzzy c-means; sequential probability ratio test Fault Diagnosis: k-nearest neighbors; supervised clustering methods; classification tree; fuzzy similarity; artificial neural networks; bagged ensemble; adaptive boosting; Learn++

Failure Prognosis: Kalman filtering; particle filtering; neural networks; fuzzy similarity; ensemble systems; support vector machines; relevance vector machines.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. Apparatus for implementing a data processing pipeline for management of a construction project and/or civil engineering project, the apparatus comprising:
   a plurality of data processing modules communicatively coupled in series, comprising a plurality of plug-in processing modules configured to receive input data objects and, based at least in part on the input data objects, produce output data objects, wherein at least some of the output data objects are used by at least one downstream improvement system to carry out remedial actions; and
   a data access layer configured to receive output data from the plurality of plug-in data processing modules and input data from at least one data source, and make the input data and the output data available in a unified data format to downstream data processing modules and the at least one downstream improvement system wherein the data access layer comprises an enterprise service bus communicatively coupled to each of the plurality of plug-in processing modules and each of the at least one downstream improvement system, and wherein the plurality of plug-in processing modules provides a diagnostic portion of the data processing pipeline, and the enterprise service bus is configured to integrate the diagnostic portion of the data processing pipeline with the at least one downstream improvement system.

2. The apparatus of claim 1 wherein the data access layer comprises a data unification processor configured to convert the input data to a plurality of unified data objects and make the unified data objects accessible to the plurality of plug-in processing modules and the at least one downstream improvement system via the enterprise service bus.

3. The apparatus of claim 2 wherein the data access layer comprises one or more filtering components configured to selectively make at least a portion of the input data available for conversion to unified data objects by the data unification processor.

4. The apparatus of claim 1 wherein the data access layer comprises an output moderator configured to aggregate output data from the plurality of plug-in processing modules, and implement a conflict resolution process if a conflict is detected in the aggregate output data.

5. The apparatus of claim 4 wherein the data access layer is configured to receive baseline reference data comprising baseline intelligence and/or configuration data, the baseline reference data made available to the plurality of plug-in processing modules via the enterprise service bus.

6. The apparatus of claim 5 wherein the output moderator is configured to adjust the baseline reference data to reduce the likelihood of conflict in output data from the plurality of plug-in processing modules.

7. The apparatus of claim 4 wherein the output moderator is configured to aggregate output data into hierarchies to produce higher level outputs, such as by roll-up of condition indicators across multiple asset components.

8. The apparatus of claim 1 wherein the data access layer comprises a notification generator configured to generate a notification based at least in part on output data objects that are pushed onto the enterprise service bus which satisfy certain conditions.

9. The apparatus of claim 1 wherein the plurality of plug-in processing modules comprises a data shaping module configured to process raw data and generate condition and key performance indicators based on the raw data, wherein each of the condition and key performance indicators comprises one or more of: a metric of a condition of an asset or process, attributes such as source data, processing descriptions and statistics, and audit information that can be used by the next step to assist in its subsequent use and interrogation.

10. The apparatus of claim 9 wherein the plurality of plug-in processing modules comprises a diagnosis/prognosis module configured to receive condition and key performance indicators generated by the data shaping module, and based at least in part on the condition and key performance indicators, generate fault objects, each of the fault objects comprising one or more of: a description or identification of the likely fault, confidence factor, weighted associated root cause, residual life estimate, meta-data about the method and explanation of how the conclusion was reached and a trace back to the underlying condition indications.

11. The apparatus of claim 10 wherein the plurality of plug-in processing modules comprises a remedial action recommendation module configured to receive fault objects generated by the diagnosis/prognosis module, and based at least in part on the fault objects, generate remedial action objects, each of the remedial action objects comprising one or more of: a description or identification of the action that should to be taken to solve or prevent an issue, a priority and time-window within which the action should take place, an explanation tracing from data to condition insights to fault and root case, and domain specific properties for use by the at least one downstream improvement system.

12. A method for implementing a data processing pipeline for management of a construction project and/or civil engineering project, the method comprising:

providing a plurality of plug-in processing modules configured to receive input data objects and, based at least in part on the input data objects, produce output data objects, wherein at least some of the output data objects are used by at least one downstream improvement system to carry out remedial actions;

receiving data from at least one data source and the plurality of plug-in data processing modules;

processing the data into data objects having a unified data format; and making the data objects in the unified data format available to downstream data processing modules and the at least one downstream improvement system comprising communicatively coupling an enterprise service bus to each of the plurality of plug-in processing modules and each of the at least one downstream improvement system and integrating the plurality of plug-in processing modules and the at least one downstream improvement system via the enterprise service bus.

13. The method of claim 12 comprising converting the input data to a plurality of unified data objects and making the unified data objects accessible to the plurality of plug-in processing modules and the at least one downstream improvement system via the enterprise service bus.

14. The method of claim 13 comprising filtering the input data prior to converting the input data to unified data objects.

15. The method of claim 12 comprising aggregating the output data from the plurality of plug-in processing modules, and implementing a conflict resolution process if a conflict is detected in the aggregate output data.

16. The method of claim 15 comprising receiving baseline reference data, the baseline reference data comprising baseline intelligence and/or configuration data, and making the baseline reference data available to the plurality of plug-in processing modules via the enterprise service bus.

17. The method of claim 16 comprising adjusting the baseline reference data to reduce the likelihood of conflict in output data from the plurality of plug-in processing modules.

18. The method of claim 15 comprising aggregating output data into hierarchies to produce higher level outputs, such as by roll-up of condition indicators across multiple asset components.

19. The method of claim 12 comprising generating a notification based at least in part on output data objects that are pushed onto the enterprise service bus which satisfy certain conditions.

20. The method of claim 12 wherein the plurality of plug-in processing modules comprises a data shaping module configured to process raw data and generate condition and key performance indicators based on the raw data, wherein each of the condition and key performance indicators comprises one or more of: a metric of a condition of an asset or task process, attributes such as source data, processing descriptions and statistics, and audit information that can be used by the next step to assist in its subsequent use and interrogation.

21. The method of claim 20 wherein the plurality of plug-in processing modules comprises a diagnosis/prognosis module configured to receive condition and key performance indicators generated by the data shaping module, and based at least in part on the condition and key performance indicators, generate fault objects, each of the fault objects comprising one or more of: a description or identification of the likely fault, confidence factor, weighted associated root cause, residual life estimate, meta-data about the method and explanation of how the conclusion was reached and a trace back to the underlying condition indications.

22. The method of claim 21 wherein the plurality of plug-in processing modules comprises a remedial action recommendation module configured to receive fault objects generated by the diagnosis/prognosis module, and based at least in part on the fault objects, generate remedial action objects, each of the remedial action objects comprising one or more of: a description or identification of the action that should to be taken to solve or prevent an issue, a priority and time-window within which the action should take place, an explanation tracing from data to condition insights to fault and root case, and domain specific properties for use by the at least one downstream improvement system.

* * * * *